June 4, 1935.  G. E. LANDT  2,003,752

BENDABLE LAMINATED PRODUCT

Filed Oct. 15, 1932

Inventor:
Gustave F. Landt
by his Attorneys
Howson & Howson

Patented June 4, 1935

2,003,752

UNITED STATES PATENT OFFICE 2,003,752

BENDABLE LAMINATED PRODUCT

Gustave E. Landt, Norristown, Pa., assignor to Continental-Diamond Fibre Company, Newark, Del., a corporation of Delaware Application October 15, 1932, Serial No. 638,026

16 Claims. (Cl. 154—43)

My invention relates to a novel laminated product and to the method of making the same, and more particularly it relates to a metal sheet united to a resin-impregnated fibrous sheet material possessing the property of bending in curves and angles without separation of the layers, one from the other, and without cracking along the lines of curvature or bend.

One object of my invention is to provide a laminated product embodying resin-impregnated fibrous sheet material securely joined to a metal sheet, which product is applicable for use in the manufacture of structural surfaces where angles and simple curves are a characteristic or necessary part of the structure.

A further object of my invention is to furnish a metal sheet united to resin-impregnated sheet material, which may be bent as desired, and may be sheared and punched without separation of the laminæ, and without fracture of the surface.

Other objects, including the process of making the laminated product having the above-stated qualities, will be apparent from a consideration of the specification and claims.

Heretofore, attempts have been made to provide a metal sheet material united with a fibrous sheet impregnated with synthetic resin which is capable of being bent to the desired curves and angles, but such attempts have not been successful, due to the fact that they have been limited to the use of thermo-setting resins, such as phenol-formaldehyde resins. Metal sheets coated with fibrous sheet material impregnated with the thermo-setting resins separate into the individual laminæ upon being subjected to the bending action. Furthermore, under such action, the fibrous sheet material becomes disconnected from the metal base and the surface of the thermo-setting resin cracks along the lines of curvature or angle.

A metal sheet associated with a resin-impregnated fibrous sheet material which may be satisfactorily bent to the desired curve or angle has long been sought, due to its applicability to many uses where a material is desired with the decorative effects that are possible with resins combined with the structural properties of sheet metal. The product also presents a surface unaffected by water, mild chemicals, and moderate heat.

By the present invention, all of the disadvantages encountered in the attempted uses of thermo-setting resins are overcome and a product is provided which will not delaminate and whose surface will not crack under the strains induced by bending. In addition, the product may be decorated in any desired manner and will be inert to water, mild chemicals and moderate heat. The product of the present invention is particularly applicable for use in structures where angles or curves are desired, and, therefore, finds wide use in the manufacture of metal furniture, such as chairs, tables, and trays, and all metal framework, such as window casings, doors, and the like. Metal conduits may also be formed from the material and a tube is thereby provided which resists attacks of corrosion.

The present invention embodies a laminated product comprising a metal sheet material to which is securely attached fibrous sheet material impregnated with a thermo-plastic resin.

Figure 1:
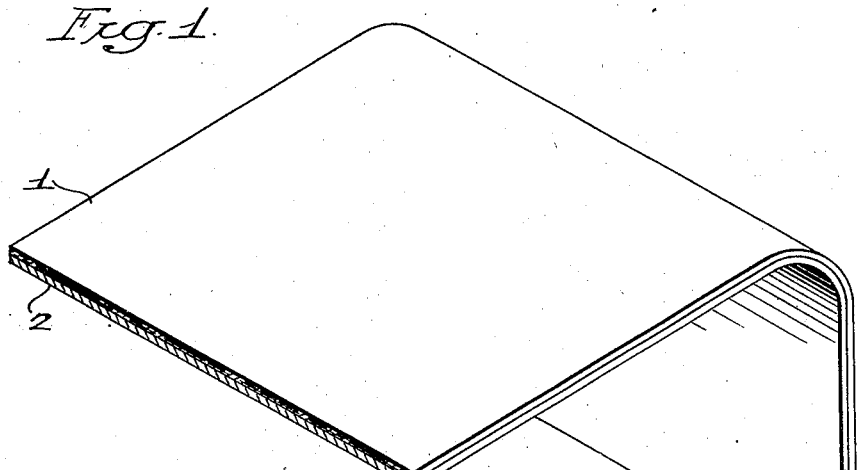
Figure 1 is a perspective view of one embodiment of the invention showing the material with a right angle bend therein.

It will be understood that the product of any of the three embodiments illustrated in the drawing may be bent to any desired angle or curvature, and that while the ability of bending without delamination or cracking is one of the major characteristics of the products, it will find wide use in instances where it is employed merely as a sheet or plate. All such products fall within the purview of the present invention.

The metal sheet material may be of any desired nature, such as steel, sheet iron, nickel, copper, zinc or aluminum, or alloys of these or other metals and is of substantial thickness and rigidity as compared to metal foil. The fibrous sheet material impregnated with the thermo-plastic resin may be paper, cloth such as canvas or duck, or asbestos in paper or cloth form. Any thermo-plastic resin, either natural or synthetic, may be employed as an impregnating agent for the fibrous sheet material. The term "thermo-plastic resin" as used herein includes those resins which soften upon the application of heat and, therefore, can be molded even though infusible. The term is used to distinguish these resins from the "thermo-setting" resins which do not soften upon the application of heat and, therefore, cannot be molded in the infusible stage. The infusible, insoluble but thermo-plastic resins of aniline and formaldehyde are particularly applicable for use in the present invention. Of the natural resins, shellac, copal, Manila gum and the accaroid resins may be utilized. The fibrous sheet material may be impregnated with the resin in any desired manner, preferably, however, in fluid form. In using the aniline-formaldehyde resins, an advantageous method of incorporating the resin with the fibrous material is to bring the resin obtained by reacting one mol of aniline with more than one mol of formaldehyde in strongly acid solution into contact with the material to be impregnated and thereafter to precipitate the resin in and on the material by the elimination of the acid, for example, by the addition of a base. If paper is to be employed, the acidic resin solution may be added to the beater containing the pulp and the resin then precipitated on the fibres. The paper sheets are thereafter made from the resin-impregnated pulp on a paper machine in the usual manner. In the case of the natural resins, alcoholic solutions thereof may be employed.

While a single resin-impregnated fibrous sheet may be employed, it will in most instances be desirable to superpose a number of resin-impregnated sheets to obtain the thickness desired. The thickness of the fibrous sheet material joined to the sheet metal may vary widely, but generally will not exceed .035 inches, a thickness of from .020 inches to .025 inches being preferred. In some cases, the thickness may be as great as .25 inches, or higher, but since a satisfactory product is obtained with the lesser thicknesses, there is no necessity of using an excess of resin-impregnated paper. If a thickness greater than .035 inches is employed, difficulty may be encountered in forming curvatures of small radii, for example, with a thickness of .035 or less, a curvature whose radius is as low as ¼ to ⅛ inch may be obtained. If, however, the thickness is increased to .0625 inches, a radius of curvature of one inch will usually be the minimum that can be produced practically, while a thickness of .125 inches usually successfully produces a radius of not less than three inches. It will thus be seen that the thickness may be increased as desired where the radius of curvature is relatively large.

The fibrous sheet material containing the thermo-plastic resin may be pre-formed into a sheet of the desired thickness prior to contacting it with the metal sheet, or a sufficient number of resin-impregnated sheets to give the desired thickness may be superposed on the sheet metal, the whole being compacted in one operation. In either event, the sheet contacting metal, or the metal may be roughened to aid in bringing about a satisfactory union between the materials.

In the first case, the resin-impregnated laminations are pre-formed in an hydraulic press, for example, at a pressure of from 500 to 1000 pounds per square inch, and at a temperature corresponding to from 60 pounds to 125 pounds of steam for 10 to 20 minutes. The pre-formed laminated sheets are then joined to the metal plate by using a cement, preferably a cement consisting of phenol-formaldehyde resin with rubber dissolved in a suitable solvent, although other quick drying cements which possess elasticity under heat may be employed. The final laminated product is prepared by subjecting the assembled pre-formed laminated sheets with the sheet metal in an hydraulic press under suitable pressure and temperature conditions, for example, a pressure of about 100 pounds and a temperature of about 150 degrees F. for a period of four or five minutes. In the second case, the resin-impregnated sheets are assembled on the metal sheet, one above the other, to give the thickness desired suitable cement being placed between the bottom sheet and the metal. The assembled sheets are then subjected to a heat and pressure treatment in an hydraulic press, for example, to a pressure ranging from 500 pounds to 1000 pounds per square inch at a temperature corresponding to from 60 pounds to 125 pounds of steam and for a period of time from 10 to 20 minutes. Since in this process only one heat and pressure treatment is necessary, it will often be found to be the most desirable. The product made by either of these methods is shown in Fig. 1, where the resin-impregnated sheets are designated at I, and the metal sheet at 2.

Figure 2:
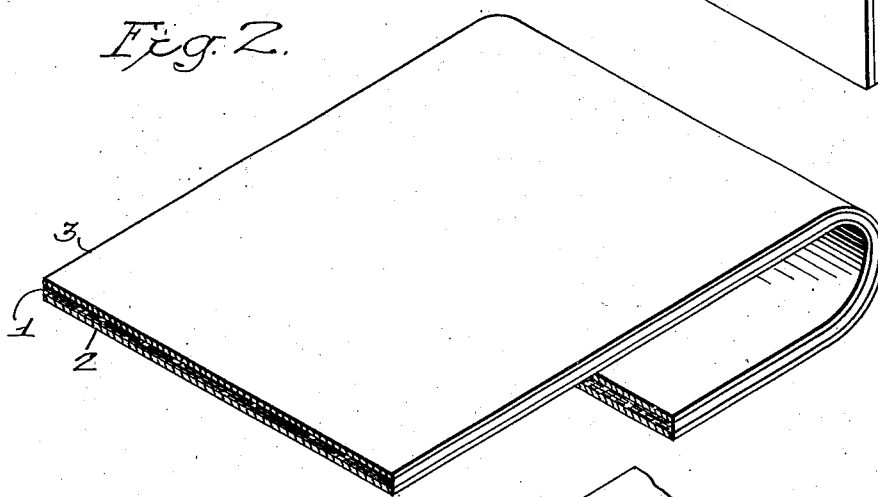
Figure 2 is a perspective view of a modification of the invention, showing the material after it has been formed with a curve therein.

The uppermost resin-impregnated fibrous sheet may be colored, or designed, as desired, for example in the imitation of natural wood. In the case of some thermo-plastic resins, it will be desirable to give the surface a better finish than can be obtained with the particular thermo-plastic resin used as the impregnating agent. In such an event, a different resin characterized by its lustrous properties may be employed at the surface of the product. The lustrous resin may be utilized in the form of a coating of clear resin, or as a facing sheet of fibrous material impregnated with the lustrous resin. If a facing sheet is used, a single ply of resin-impregnated paper is the most desirable. The use of the facing sheet is particularly applicable where designs or decorations of the product are advantageous. The phenol-formaldehyde resins, or the urea-formaldehyde resins, both of which possess a high lustre, are applicable and are of particular advantage when employed with a laminated structure composed of fibrous sheets impregnated with an aniline-formaldehyde resin. The coating or the facing sheet is brought into contact with the main body of resin-impregnated sheets prior to the heat and pressure steps which consolidates the superposed sheets. In Fig. 2 this product is shown where I represents the main body of resin-impregnated sheets; 2, the metal sheet; and 3, the coating of lustrous resin or the facing sheet containing the lustrous resin.

Figure 3:
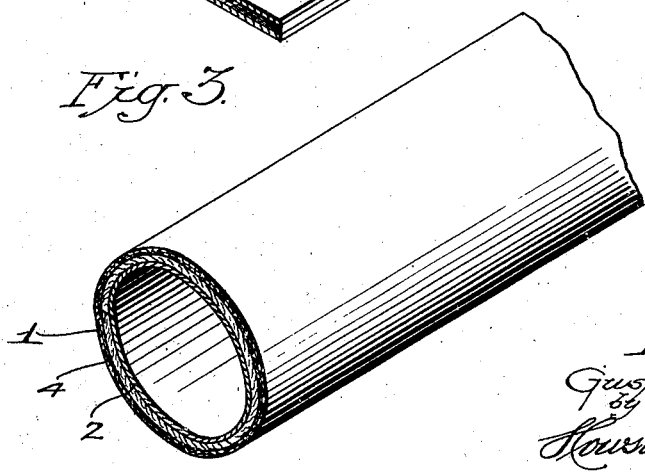
Figure 3 is a perspective view of a further modification of the invention, showing a tube made from the product.

In many instances it will be desirable to relieve the strains encountered in the bending operation by placing a compressible layer between the resin-impregnated laminated sheets and the metal sheet. This compressible layer may be felt, paper, cloth, cork, asbestos or other material, and it functions to absorb the strains and to prevent a rupture of the fibres in the resin-impregnated sheets when strains are set up therein. A thickness of .007 inches to .015 inches in the compressible layer is sufficient for the purpose, although greater thicknesses may be employed if desired. If the laminated sheets are pre-formed prior to their union with the metal sheet, the compressible sheet is placed in the hydraulic press and joined to the resin-impregnated fibrous sheets by the same heat and pressure step which consolidates them, the resin in the resin-impregnated sheets flowing sufficiently to unite the compressible sheet therewith. The pre-formed product containing the compressible sheet is then joined to the sheet metal by means of a suitable cement as hereinbefore described. In the event that the resin-impregnated sheets are consolidated and joined to the metal sheet in one operation, the compressible layer is interposed between the metal sheet and the resin-impregnated fibrous sheets prior to the subjection to the heat and pressure treatment. In this case also a cement is employed to join the compressible sheet to the metal sheet. In either process, the compressible sheet may be impregnated with cement, as well as coated therewith. In Fig. 3, this product is shown where 1 represents the main body of the resin-impregnated sheets, 2 the metal sheet, and 4 the compressible layer. If desired, this product may also have a coating of a lustrous resin, such as has been previously described and as is shown in Fig. 2.

After the material is assembled and compacted by heat and pressure, irrespective of the particular embodiment of the invention and regardless of the particular method by which it is made, it may be bent in any suitable manner, such as in a die or any metal bending machine well known in the art. In order to bend it in the most satisfactory manner, the material is heated to a temperature in the neighborhood of 150 degrees F. to 200 degrees F., or higher. The most satisfactory method for heating the product is to immerse it in the hot water until it assumes the temperature of the water throughout, which may be from two to four minutes or upwards, depending upon the thickness and bulk of the product. The small amount of water absorbed by the product facilitates the bending operation.

Considerable modification is possible in the methods employed in making the product, as well as in the steps of manufacture without departing from the essential features of the invention.

I claim:

1. A laminated product capable of being bent without delamination of the layers or cracking of the surface, comprising fibrous sheet material impregnated with a thermo-plastic resin securely united to a metal sheet of substantial thickness and rigidity.

2. A laminated product capable of being bent without delamination of the layers or cracking of the surface, comprising a plurality of superposed fibrous sheets impregnated with a thermo-plastic resin consolidated together and securely united to a metal sheet of substantial thickness and rigidity.

3. A laminated product capable of being bent without delamination of the layers or cracking of the surface, comprising fibrous sheet material impregnated with an infusible, insoluble thermo-plastic aniline-formaldehyde resin securely united to a metal sheet of substantial thickness and rigidity.

4. A laminated product capable of being bent without delamination of the layers or cracking of the surface, comprising a plurality of superposed fibrous sheet material impregnated with an infusible, insoluble thermo-plastic aniline-formaldehyde resin consolidated together and securely united to a metal sheet of substantial thickness and rigidity.

5. A laminated product capable of being bent without delamination of the layers or cracking of the surface, comprising fibrous sheet material impregnated with a thermo-plastic resin securely united to a metal sheet of substantial thickness and rigidity, said fibrous sheet material being coated with a lustrous resin.

6. A laminated product capable of being bent without delamination of the layers or cracking of the surface, comprising a plurality of superposed fibrous sheet material impregnated with a thermo-plastic resin consolidated together and securely united to a metal sheet of substantial thickness and rigidity, said fibrous sheet material being coated with a lustrous resin.

7. A laminated product capable of being bent without delamination of the layers or cracking of the surface, comprising fibrous sheet material impregnated with an infusible, insoluble thermo-plastic aniline-formaldehyde resin securely united to a metal sheet of substantial thickness and rigidity, said fibrous sheet material being coated with a lustrous resin.

8. A laminated product capable of being bent without delamination of the layers or cracking of the surface, comprising a plurality of superposed fibrous sheet material impregnated with infusible, insoluble thermo-plastic aniline-formaldehyde resin consolidated together and securely united to a metal sheet of substantial thickness and rigidity, said fibrous sheet material being coated with a lustrous resin.

9. A laminated product capable of being bent without delamination of the layers or cracking of the surface, comprising fibrous sheet material impregnated with a thermo-plastic resin united to a layer of compressible material which is united to a metal sheet of substantial thickness and rigidity.

10. A laminated product capable of being bent without delamination of the layers or cracking of the surface, comprising a plurality of superposed fibrous sheet material impregnated with a thermo-plastic resin consolidated together and united to a compressible layer which is united to a metal sheet of substantial thickness and rigidity.

11. A laminated product capable of being bent without delamination of the layers or cracking of the surface, comprising fibrous sheet material impregnated with an infusible, insoluble thermo-plastic aniline-formaldehyde resin united to a compressible layer which is united to a metal sheet of substantial thickness and rigidity.

12. A laminated product capable of being bent without delamination of the layers or cracking of the surface, comprising a plurality of superposed fibrous sheet material impregnated with an infusible, insoluble aniline-formaldehyde thermo-plastic resin consolidated together and united to a compressible layer which is united to a metal sheet of substantial thickness and rigidity.

13. A laminated product capable of being bent without delamination of the layers or cracking of the surface, comprising fibrous sheet material impregnated with a thermo-plastic resin united to a layer of compressible material which is united to a metal sheet of substantial thickness and rigidity, said fibrous sheet material being coated with a lustrous resin.

14. A laminated product capable of being bent without delamination of the layers or cracking of the surface, comprising a plurality of superposed fibrous sheet material impregnated with a thermo-plastic resin consolidated together and united to a compressible layer which is united to a metal sheet of substantial thickness and rigidity, said fibrous sheet material being coated with a lustrous resin.

15. A laminated product capable of being bent without delamination of the layers or cracking of the surface, comprising fibrous sheet material impregnated with an infusible, insoluble thermo-plastic aniline-formaldehyde resin united to a compressible layer which is united to a metal sheet of substantial thickness and rigidity, said fibrous sheet material being coated with a lustrous resin.

16. A laminated product capable of being bent without delamination of the layers or cracking of the surface, comprising a plurality of superposed fibrous sheet material impregnated with an infusible, insoluble aniline-formaldehyde thermo-plastic resin consolidated together and united to a compressible layer which is united to a metal sheet of substantial thickness and rigidity, said fibrous sheet material being coated with a lustrous resin.

GUSTAVE E. LANDT.

DISCLAIMER 2,003,752.—*Gustave E. Landt*, Norristown, Pa. BENDABLE LAMINATED PRODUCT. Patent dated June 4, 1935. Disclaimer filed February 5, 1936, by the assignee, *Ciba Products Corporation*.

Hereby enters this disclaimer to claims 1, 2, 5, and 6 in said patent.

[*Official Gazette February 25, 1936.*]

DISCLAIMER 2,003,752.—*Gustave E. Landt*, Norristown, Pa. BENDABLE LAMINATED PRODUCT. Patent dated June 4, 1935. Disclaimer filed October 12, 1936, by the assignee, *Ciba Products Corporation*.

Hereby enters this disclaimer to claims 9 and 13 in said patent.

[*Official Gazette November 3, 1936.*]